United States Patent [19]

Cross et al.

[11] Patent Number: 4,746,205
[45] Date of Patent: May 24, 1988

[54] HIGH ENERGY LASER BEAM REPLICA PRODUCING METHOD AND SYSTEM

[75] Inventors: Michael A. Cross, Severna Park; Edward W. Nichols, Reisterstown, both of Md.

[73] Assignee: Westinghouse Electric Corp., Pittsburgh, Pa.

[21] Appl. No.: 9,842

[22] Filed: Jan. 30, 1987

[51] Int. Cl.$^4$ .................. G02B 7/00; G02B 27/10; G02B 5/08; G02B 5/10

[52] U.S. Cl. .................. 350/574; 350/169; 350/602; 350/620

[58] Field of Search .............. 350/169, 174, 442, 444, 350/505, 574, 602, 620, 162.11; 372/95, 99

[56] References Cited

U.S. PATENT DOCUMENTS

| | | | |
|---|---|---|---|
| 2,916,966 | 12/1959 | Nomarski et al. | 88/57 |
| 3,584,937 | 7/1971 | Nishimoto | 350/294 |
| 3,614,449 | 10/1971 | Ward, III | 250/203 |
| 3,748,015 | 7/1973 | Offner | 350/55 |
| 3,858,046 | 12/1974 | Cubalchini | 250/353 |
| 4,475,793 | 10/1984 | Ford | 350/172 |

Primary Examiner—John K. Corbin
Assistant Examiner—Jay P. Ryan

[57] ABSTRACT

An attenuated fiducial replica of the far field pattern of a high energy laser beam is obtained by a system and method wherein a first fraction of an incident high energy beam is deflected from one reflective surface of a holey plate and the diffracted orders of the beam are transmitted from the holes to a concave reflector, which reflects diffracted orders toward an opposite reflective surface of the holey plate. A zinc selenide partially reflective member is disposed on-axis between the rear reflective surface and the concave surface for re-reflecting successive fractional portions of the re-flected beam a selected number of times to attenuate the beam converging upon a focal plane from an effective focal distance greater than the physical length of the optical system.

16 Claims, 3 Drawing Sheets

HIGH ENERGY LASER BEAM REPLICA PRODUCING METHOD AND SYSTEM

BACKGROUND OF THE INVENTION

The present invention relates to high energy laser beam attenuation; and more particularly, to an improved method and system for producing an attenuated fiducial replica of a high energy laser beam.

High energy laser beams are typically defined as having a peak power in the neighborhood of 15 megawatts; and may be collimated in the form of a circular beam or an annular beam having a large external diameter, in the neighborhood of 8 to 12 inches, for example, in order to achieve small beam divergence. With the advent of increased use, it has become increasingly necessary to characterize high energy laser beams, in terms of beam divergence, energy distribution in the far field footprint, and centroid behavior of beams. In order to accomplish such characterization, it is necessary, because of such high power, to produce a highly attenuated fiducial replica of the far field pattern of the beam to be characterized, having total power in the neighborhood of a fraction of a watt, for example, so that desired measurements may be derived from appropriate sensors placed in the focal plane of the beam.

The current practice of producing a high energy laser beam replica involves intercepting the laser beam by a two dimensional diffractive beam sampler, which exhibits a very small power transmittance in the diffracted orders; and diverting the bulk of the laser energy into an optical absorber, or dump, in an essentially non-dissipative manner. The low energy transmitted diffracted orders are collected by suitable long focal length focusing optics to produce an attenuated far field fiducial replica of the incident high-energy laser beams in the focal plane. Heretofore, a long focal length (e.g., 40 meters) was necessary in order to obtain a replica of sufficient size for proper resolution when characterizing beams of small divergence.

A two-dimensional beam sampler that is widely used for attenuation is a diffraction grating that is comprised of a thin highly reflective plate that is perforated with an array of small holes to provide a representative transmittance sampling over the entire area of the collimated beam. Such a two dimensional beam sampler has the ability to accommodate very high incident peak and average power levels; and the zero order, or on-axis, beam is relatively insensitive to tolerance levels in hole placement, or shift in hole locations, caused by thermal drift. The diameter and density of these holes control the fraction of incident laser power that is transmitted through the grating. The goal is to transmit the smallest fraction of laser energy, while obtaining a true representative sampling of the entire beam; and yet provide adequate angular separation between the zero order beam and adjacent diffracted orders to fully resolve the zero order beam and its sidelobes. This is achieved by the proper selection of hole spacing, which, of course, in turn dictates hole density, i.e., number of holes per unit area. Once hole density is fixed, the grating transmittance is determined by the selection of hole diameter.

Prior to the present invention, a very small grating transmittance, and thus very small holes, were required in order to non-dissipatively deflect the bulk of the laser power. For example, if the peak zero order power of an attenuated fiducial replica in the focal plane is to be less than 0.5 watts, and the peak input power to the diffraction grating is 15 megawatts, a grating transmittance of $1.79 \times 10^{-4}$ is necessary. Thus, if an 800 micro-radian separation of adjacent orders is necessary to adequately resolve a number of 100 micro-radian features, for example, the spacing density of the holes require hole diameters of approximately 0.008 inches.

Since it is essential that true hole diffraction occur, rather than diffraction from a deep hole which simulates a cylindrical wave guide, the hole depth should not exceed approximately 25 percent of the hole diameter, or 0.002 inches, in the present example. This, of course, requires that the diffraction grating be made of (1) a very thin plate, which, of course, is undesirable because of lack of rigidity and lack of capability to preserve the flatness of the reflective surface; or (2) a thicker plate, with the small holes being counterbored to within a few mils of the opposite surface, which further increases the difficulty of fabrication. Further, because of the mounting of the diffraction grating at an angle (typically 45°) with respect to the optical axis of an incident laser beam for convenient deflection requiring that the axis of the very small shallow depth holes be at an angle to the plane of the reflective surface of the plate, such a grating fabrication is further complicated.

As previously mentioned, to produce a replica which has a large enough image size in the focal plane, to match the image size of an available sensor area, for maximizing image resolution, very long focal length optics are required. For example, in order to match a sensor area that is 17 millimeters in diameter, which is required for a 400 micro-radian field of view, a focal length of approximately 42 meters is required. Since there is a particular need for field deployable replica producing systems, which may be readily transported on an over-the-road vehicle, the actual physical length of the system, as well as its overall size, should be minimized. Compact test optics are desirable in normal environments but particularly so where mobility is at stake. Specifically, it is desirable that any linear dimension of a system for producing an attenuated replica be in the neighborhood of one and one-half meters, for example. The use of a Cassegranian optical system may be utilized to shorten the physical length of the optics while still maintaining a long effective focal length, but such a resulting system would still be longer than would be convenient for a vehicle transportable system. Further, the use of relay optics may also be considered to increase the effective focal length of the system, while still saving space, but the magnification must be kept low in order to preserve image quality when using existing camera optics, such as a Pyro-electric vidicon camera, for example, as a sensor.

SUMMARY OF THE INVENTION

It is an object of the present invention to provide a system for producing an attenuated far field replica of a high energy laser beam that has a long effective focal length, while having a substantially shorter physical length.

Another object of the present invention to provide such a system where the diffraction grating may be easily fabricated without the necessity of very small holes and close tolerances.

A further object of the present invention is to provide such a system that does not degrade zero order image quality.

A still further object of the present invention is to provide such a system that is relatively easy to align optically, simple to adjust, and relatively inexpensive to manufacture.

Additional objects and advantages of the present invention will be set forth in part in the description which follows; and in part, will be obvious from the description or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a system for producing an attenuated far field fiducial replica of a high energy laser beam of the invention comprises a first deflecting means for non-dissipatively deflecting a first fraction of laser beam energy of an incident laser beam source in an angular direction to the axis of the incident beam; means for transmitting the undeflected incident laser beam energy having energy substantially greater than the replica to be produced, in a forward direction substantially parallel to the axis of the incident laser beam; means for reflecting substantially the remaining fraction of the transmitted laser beam energy in a rearward direction surrounding the axis of the laser beam source; optical folding means disposed between the transmitting means and the reflecting means in axial alignment with the transmitted laser beam operative for re-reflecting in a forward direction surrounding the axis of the transmitted beam a fractional portion of each reflected fraction a predetermined number of times for producing in a focal plane substantially on the axis of the transmitted beam a far field replica of the laser beam source having attenuated energy corresponding to the final re-reflected fractional portion of the reflected fraction, the optical folding means being disposed and configured to provide an effective focal length substantially longer than the physical length of the system; second deflecting means disposed opposite the first deflecting means operative to deflect non-dissipatively rearwardly reflected laser energy in an angular direction to the axis of the transmitted laser beam, said deflected energy constituting a second fraction of the total energy deflected by the system; and means for absorbing the first and second fraction of the deflected laser beam energy.

The accompanying drawings which are incorporated in and constitute a part of this specification, illustrate preferred embodiments of the invention and, together with the description, serve to explain the principles of the invention.

DESCRIPTION OF PREFERRED EMBODIMENTS

Reference will now be made in detail to the present preferred embodiments of the invention, examples of which are illustrated in the accompanying drawings.

Figure 1:
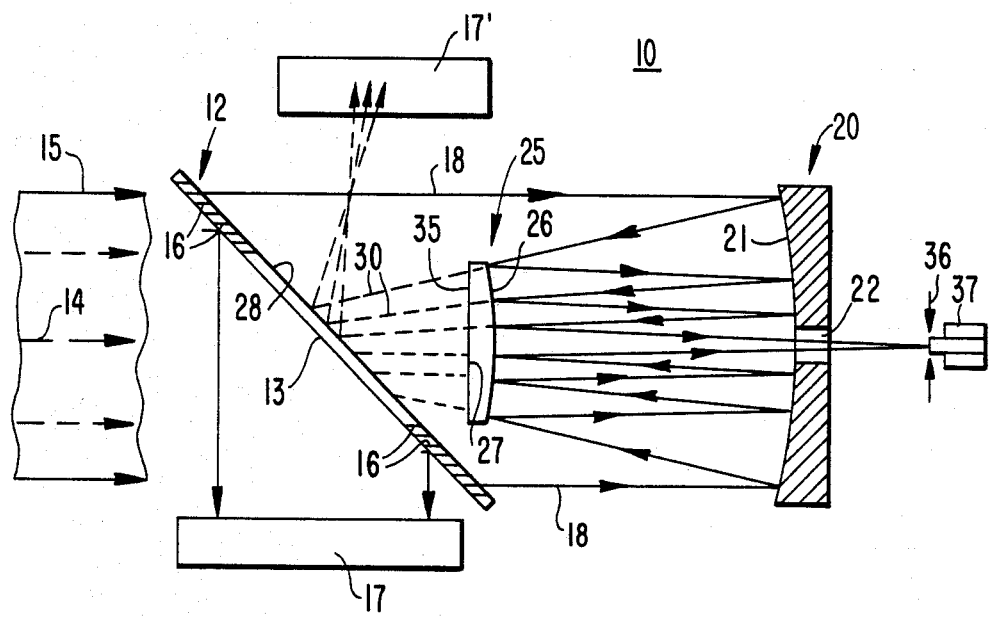
FIG. 1 is a schematic diagram of a system for producing an attenuated fiducial replica of a high energy laser beam in accordance with a preferred embodiment of the present invention.
Figure 2:
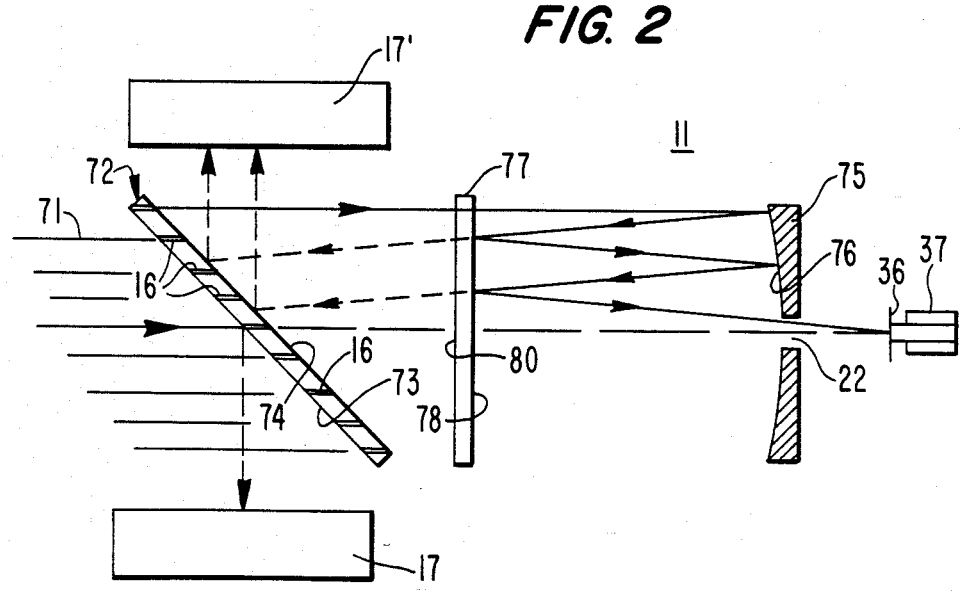
FIG. 2 is a schematic diagram of a system for producing an attenuated fiducial replica of a high energy laser beam in accordance with another preferred embodiment of the present invention.

The present preferred embodiments of the system for producing an attenuated replica of a high energy respective laser beam are represented generally in FIGS. 1 and 2 by reference numerals 10 and 11, respectively. Referring to the embodiment of FIG. 1, system 10 comprises a plate 12, and as embodied herein first deflecting means includes a first or front highly reflective flat surface 13 and a second, or rear, highly reflective flat surface 28. Plate 12 may be oriented at a 45 degree angle to axis 14 of an incident annular laser beam 15 for deflecting a fraction of laser energy at an angle to axis 14 for absorption by an absorber or a dump 17. Absorber 17 may be any conventional device or material, such as firebrick, for example. Also, as embodied herein transmitting means is comprised of a plurality of spaced holes 16 in plate 12, which are selectively spaced to form an annulus (see FIG. 4) of a selected density for transmitting diffracted orders 18 of laser energy in a forward direction as represented by the direction of arrow of axis 14 of laser beam 15. As herein embodied, means for reflecting transmitted diffracted orders 18 in a rearward direction surrounding the axis of a diffracted order 18, includes reflector 20 having a spherical concave surface 21 with a central aperture 22.

In accordance with the embodiment of FIG. 1, optical folding means may include a partially reflective member 25 having a convex surface 26 opposing reflective surface 21, and planar surface 27 opposing flat highly reflective surface 28 of plate 12, which surface 28 constitutes second deflecting means, as herein embodied, for deflecting reflected laser energy represented by dashed lines 30 into a dump 17' similar to dump 17.

Figure 3:
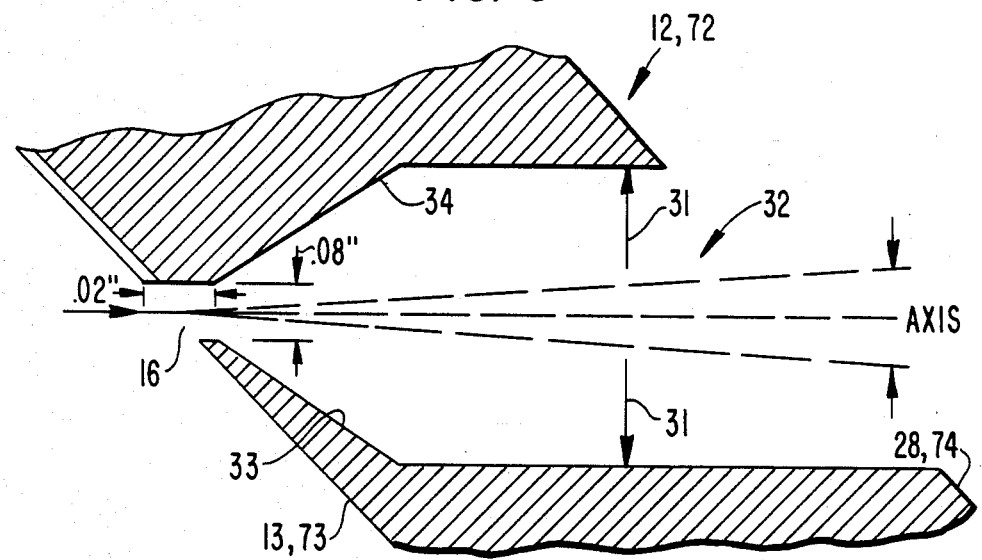
FIG. 3 is a highly magnified fragmentary sectional view of a diffraction grating illustrating the geometry of a single hole in accordance with the present invention.
Figure 4:
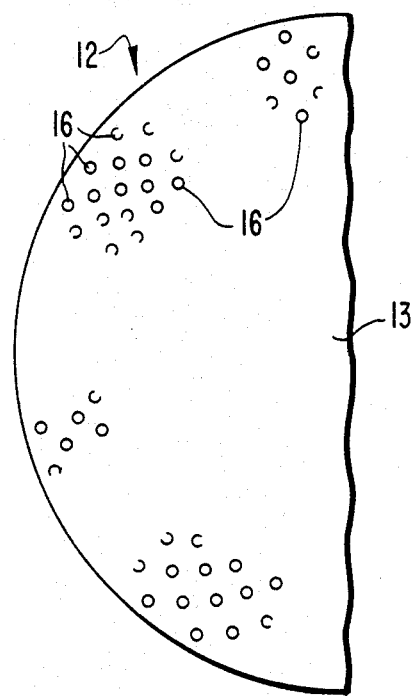
FIG. 4 is a fragmentary plan view of a plate illustrating an arrangement of spaced holes for effecting transmittance and diffraction of an annular laser beam for use in the system of FIG. 1.

Referring in detail to the present invention, and with reference to FIGS. 3 and 4, holes 16 in plate 12 are preferably spaced such that adjacent diffracted orders, or individual beam overlap does not occur after laser beam 15 passes through holes 16. Also, diameter of holes 16 may be increased an order of magnitude, or ten times the maximum diameter that would be required for a conventional system. Such an increase in hole diameter results in a corresponding increase in the transmittance of laser energy through holes 16 by two orders of magnitude, or a hundred times more than would be permitted in conventional systems, for example. This surplus energy is subsequently removed in a non dissipative manner as will be described, thus permitting the use of large holes.

For one specific implementation, plate 12 may have holes 16 having a diameter in the neighborhood of 0.08 inches where a conventional grating would require holes having diameters in the neighborhood of 0.008 inches.

With reference to FIG. 3, plate 12 may have an overall thickness, if desired, in the neighborhood of 0.02 inches, since it is essential that true hole diffraction of high energy laser beam 15 occurs rather than diffraction from a cylindrical wave guide that would be simulated by a hole deeper than approximately 25 percent of hole diameter. For applications such as illustrated in FIG. 3, where a thicker member or plate 12 is desired, to provide rigidity and to preserve the flatness of reflective surfaces 13 and 28, holes 16 may be provided with a counterbore 32 to have a diameter represented by arrows 31 with such counterbore 32 tapering inwardly at peripheral surfaces 33 and 34 of holes 16. Since it is preferable to mount plate 12 such that reflective surfaces 13 and 28 are substantially at a 45° angle to axis 14 of laser beam 15; hole 16, and of course counterbore 32 (if provided), are formed at an angle, so that a portion of peripheral surface 34 of hole 16 is thicker than a diametrically opposed peripheral surface 33 of hole 16. Since a larger diameter hole 16 in accordance with the present invention is permitted, the thickness of plate 12 in the vicinity of the periphery of hole 16 may be correspondingly thicker thus permitting a relatively easily configured counterbore 32. Counterbore 32 diameter is limited, of course, practically by the spacing of holes 16 and operationally by actual diffraction envelope width of incident laser beam as hereinafter discussed.

In accordance with the preferred embodiment of the present invention, optical folding means include partially reflective optical member 25 which is disposed between reflective surface 28 of plate 12 and reflective surface 21 of reflector 20, and which is oriented such that the axis of member 25 is aligned with central aperture 22. Partially reflective member 25 as embodied in FIG. 1, has a convex surface 26 opposing concave surface 21 and a planar surface 27 which opposes reflective rear surface 28. Surface 27 is coated with a conventional anti-reflective coating 35 that reflects approximately 1/10 of one percent of laser energy incident on planar surface 27. Approximately 17 percent of laser energy is reflected from surface 26. Preferably, member 25 may be a lens made of zinc selenide (ZnSe) which is a material having low absorption far infrared spectrum. Thus, in accordance with the present invention partially reflective optical member 25 is disposed to intercept and re-reflect successive fractions (app. 17 percent) of reflected laser beam diffracted orders 18 for transmission of the attenuated replica through central aperture 22 to a focal plane referred to as 36 of FIG. 1, where a sensor such as a vidicon camera 37 is to be located for characterization. Member 25 is so constituted and disposed at the selected distance to produce an attenuated replica having an effective focal length substantially longer than the effective focal length of primary reflector 20.

The optical folding and multiple reflections on surfaces 21 and 26 (FIG. 1) not only provide for non-dissipative energy removal but also achieve a long effective focal length in a very compact form. As embodied in FIGS. 1 and 2, the optics may be termed either "modified Cassegrainian" (FIG. 1) or "thick mirror" (FIG. 2), respectively, wherein path folding, that is, reflection and re-reflection of the attenuated laser beam, achieves large multiplication factors relative to reflector 20 (or 75) focal length, coupled with a compact geometry. The embodiment in FIG. 1 is well suited to accept laser beams of annular cross section, which is common for most expanded high energy laser beams.

For a more complete understanding, a detailed discussion of parameters and operation of the embodiment of FIG. 1 will be discussed in connection with FIG. 6, wherein a raytrace diagram is shown for an extreme outer ray 40 and an inner ray 41 of of an annular high energy laser beam such as 15 after leaving diffraction plate 12. As illustrated in such diagram, the separation between plate 12 and concave spherical surface 21 is approximately 1.1 meters, which fixes the length of the system; and the separation between surface 26 and surface 21 is approximately 1.05 meters at the axis. Outer ray 40 has a typical ray height or distance from center 22 of 15 centimeters at point 43 as it strikes surface 21. Ray 40 then reflects at point 43 to convex surface 26 of partially reflective member 25 at point 44 approximately 6.22 centimeters from optical axis 45 of lens 25. Approximately seventeen percent of the laser energy is re-reflected at point 44 back to concave spherical surface 21 at point 46 which is approximately 5.6 centimeters from the center of aperture 22. This outer ray 40 then reflects from point 46 on surface 21 to point 47 on partially reflective member 25, which is approximately 1.7 centimeters from optical axis 45. Ray 40 again re-reflects from point 47 approximately 17% of the energy reflected at 46 to pass through aperture 22 to contribute to the attenuated fiducial replica at focal plane 36 which is approximately one-tenth of a meter beyond primary reflector 20. Each time ray 40 is re-reflected from member 25, it loses all but 17 percent of its energy. Thus, with two re-reflections from surface 26, the transmitted diffraction orders lose all but approximately 0.0289 of the energy.

Inner ray 41 strikes concave spherical surface 21 of reflector 20 approximately 8.8 centimeters from optical axis 45 at point 48. This ray 41 then reflects from point 48 to point 51 on member 25. The aforenoted fractional portion is then re-reflected from point 51 to point 52 on surface 21 which is approximately 3.3 centimeters from optical axis 45. Ray 41 is then reflected from point 52 on surface 21 to point 53 on member 25, where the power of the attenuated replica as above mentioned is re-reflected from a point of approximately 1.02 centimeters from optical axis 45 through aperture 22 to focal plane 36.

Curve 55 near aperture 22 represents a diffraction envelope of ray 41. From the diagram it is seen that envelope 55 decreases in energy until it nulls at 56 adjacent the periphery of aperture 22. In the event that the diffraction envelope, such as 55 should be of a width that would result in undesired on-axis spillover of adjacent order energy 52 into focal plane 36, the replica at focal plane 36 would not be clear or representative of the laser beam source 15. Thus, the diameter of holes 16 are increased as previously mentioned in order to shrink envelope width of a diffraction envelope such as 55, to an optimum, or at least to an extent that a first null represented at 56 is on-axis to minimize spillover.

In this example, single hole diffraction envelope 55 for zero order ray is centered approximately 3.3 centimeters off axis 45 with first nulls of the beam being approximately 2.54 centimeters from the axis. Thus, single hole diffraction envelope 55 for the inner ray trace is the ray most likely to cause undesired spillover of adjacent order energy into primary focal plane 36 in the event that holes 16 are of insufficient diameter.

Figure 6:
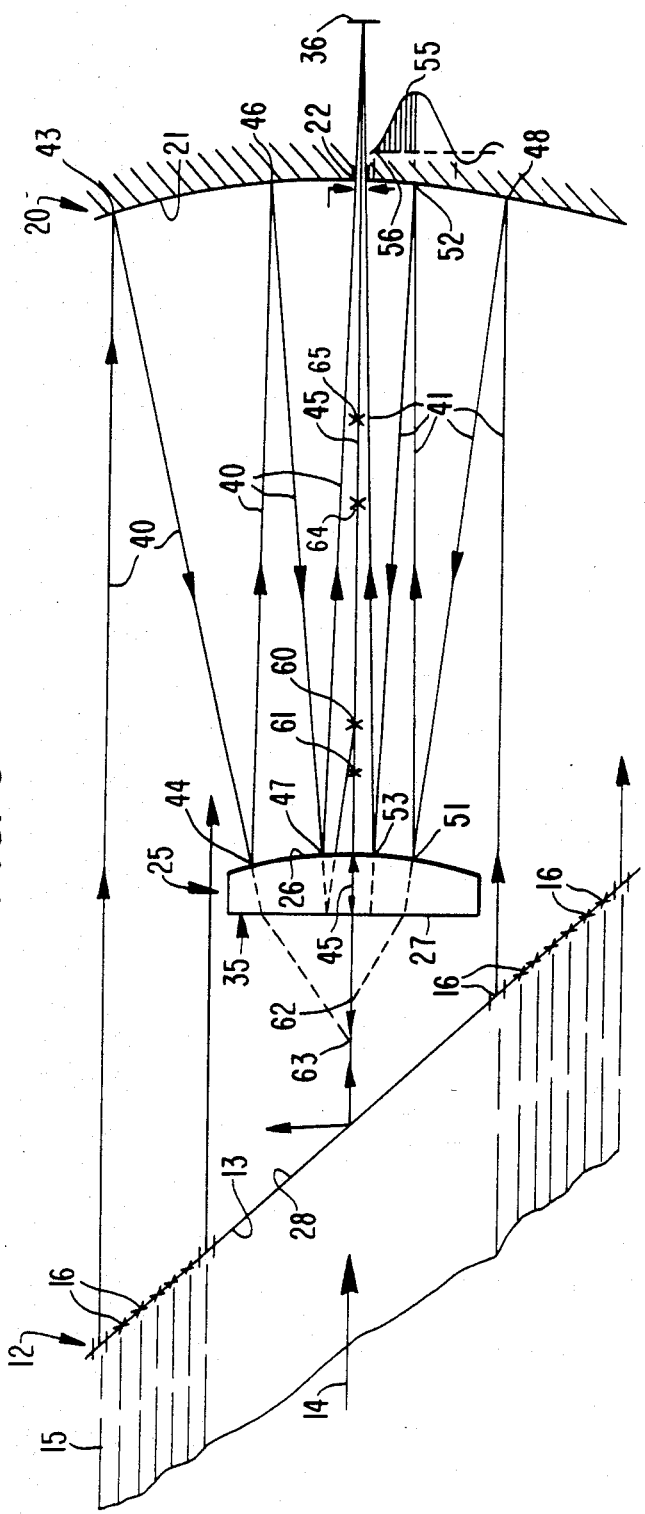
FIG. 6 is a schematic diagram illustrating a limited raytrace for extreme inner and outer rays of an annular high energy laser beam leaving the transmitting means in a system according to the present invention as embodied in FIG. 1.

With further reference to FIG. 6, two demagnified ghost images 64 and 65 of diffraction grating 12 are formed along optical axis 45 between member 25 and reflector 20 by reflections from planar surface 27 of member 25. These images 64 and 65 are real, because partially reflective member 25 behaves as a bi-convex lens in the reflection mode; and this fact modifies the effective focal length of the optical system associated with the ghosts. Thus, in the example described involving a single pass between members 20 and 25, ghost 65 has an effective focal length of approximately 76.7 centimeters and is located approximately 66.7 centimeters from surface 26. For the ghost involving a double pass between members 20 and 25, the effective focal length is 2.238 meters. These focal lengths together with the reflection coefficients of member 25 determine power densities exhibited by on-axis foci 60 and 61 for given peak power input and beam divergence. Additional n on-axis foci 62 and 63 may be produced by energy transmitted through member 25 which is en route to energy dump 17'. These foci 62 and 63 are less significant because they lie outside folded space between members 25 and 20 in which air breakdown must be avoided. No air breakdown is expected between members 25 and 20.

The following values are predicted power densities of an axis foci for a zero order replica exhibiting 10-4 radians divergence:

|  | POWER DENSITY[1] WATTS/CM$^2$ |
| --- | --- |
| FOCI INSIDE FOLDED SPACE: BETWEEN MEMBERS 20 AND 25 | |
| A) Single pass between members - Atten. Factor = $0.7 \times 10^{-3}$ EFL = 76.7 cm | $7.28 \times 10^4$ |
| B) Dual pass between members - Atten. Factor = $.12 \times 10^{-3}$ EFL = 223.8 cm. | $0.15 \times 10^4$ |
| FOCI OUTSIDE FOLDED SPACE: BETWEEN MEMBERS' 25 AND 12 | |
| A) First pass transmitted - Atten. Factor = 0.83 EFL - 108.3 cm | $4.33 \times 10^7$ |
| B) Second pass transmitted - Atten. Factor = 0.12 EFL = 288 cm | $0.09 \times 10^7$ |

[1]For a grating of transmittance $1.79 \times 10^{-2}$ receiving 15 MW peak power.

The following is a table describing attenuation factor, and system EFL as a function of the number of reflections. The required element spacing is also shown.

| NO. OF REFLECTIONS | ATTENUATION FACTOR | MEMBER 20 OR 25 SEPARATION | EFL |
| --- | --- | --- | --- |
| 2 | .0289 | 1.09069 M. | 8.84 M. |
| 3 | .0049 | 1.02237 M. | 17.04 M. |
| 4 | $8.3 \times 10^{-4}$ | 1.00558 M. | 33.8 M. |
| 5 | $1.42 \times 10^{-4}$ | 1.00139 M. | 67.3 M. |

The following is an example of a system that may be actually constructed in accordance with the embodiment of FIG. 1.

Reflector 20 (Metallic) Radius 3.6 M Aperture 31 CM
Member 25 (ZnSe) Radius 1.6 M DIA. 15 CM
Separation between 20 and 25 1.0536 M±0.6 MM.
  Two Reflections at Member 25—Atten. Factor 0.0289
  Holey Plate Diffraction Grating Aperture >30 CM (Function of Tilt Angle)
  Grating Hole Spacing 1.325 CM (For 800 μRAD Order Separation)
  Grating Hole Diameter 0.2 CM
  Grating Transmittance $1.79 \times 10$-2 (Calculated)

In considering folded optic sensitivity to mechanical misalignments of the members 25 and 20 relative to each other, it is necessary to separate the consequences in terms of pointing and aberrational errors. In principle, pointing errors are easily compensated by re-aiming the optical system, but in doing so aberrational errors may increase due to off axis operation. Since optical system 10 comprises two spherical surfaces 21 and 26, it exhibits a natural axis of symmetry passing through the centers of curvature without regard for the orientation of members 20 and 25, respectively. Thus, the optical axis dictated by aiming considerations may be both laterally displaced from and make an angle with the natural axis of symmetry. For purposes of analysis, a relative decentering of the elements has been assumed in which the center of curvature of the partially reflective member 25 has been laterally displaced approximately one centimeter relative to an axis passing through the primary center of curvature and the vertex of the member 20. This axis therefore makes an angle of approximately 10.5 milliradians with the natural axis 45, so that for this, and smaller angles it would be expected that the lowest order aberrations would be dominant. The computation of primary or lowest order aberrations follows Conrady's well-known method for an oblique pencil of rays for any point of field which accommodates both meridianal and skew rays provided the surface curvatures of members 25 and 20 are moderate. Although this method yields five terms expressing contributions to total error as optical path differences, only the spherical, comatic, and astigmatic contributions are calculated. The remaining terms, Petzval curvature and distortion, may be compensated for by the depth of focus and pointing adjustment, respectively. Computed values of optical path difference (OPD) with respect to optical system paraxial focus for $\lambda = 10.6 \times 10$-6 M.:

| | OPD CONTRIBUTION | |
| --- | --- | --- |
| ABERRATION | FROM RAYTRACE | FROM ANALYTICAL EXPN. |
| SPHERICAL | $1.61 \times 10^{-6}$ M | $1.58 \times 10^{-6}$ M |
| COMA | — | $1.02 \times 10^{-8}$ M |
| ASTIGMATISM | — | $1.33 \times 10^{-8}$ M |

It should be noted that λ/4 Rayleigh Criterion OPD = $2.65 \times 10^{-6}$ M
Calculated Paraxial EFL = 9.978 M
Depth of Focus in Primary Focal Plane Calculated on Basis of Rayleigh Limit
$$\frac{\lambda}{N1 \; SIN^2 \; U_{MAX}} = 4.56 \; CM.$$

It is seen that spherical aberration is far more significant than coma or astigmatism; and that there is good agreement between the optical path difference values determined from ray trace data and Conrady's analytical method. Furthermore, all optical path difference contributions fall well inside the Rayleigh λ/4 criterion for a focal plane chosen to be coincident with either paraxial or marginal ray foci. If a plane of "best focus" were selected midway between these foci, the optical path difference contributions may be reduced by a factor of approximately 4. Thus, as decentering tolerances can be held to less than one centimeter, the linear summation of all optical path difference contributions is predicated to be less than λ/4 for spherical reflecting surfaces. Small optical path difference errors are particularly desirable in coherent imaging, and it is not expected that higher order aberrations will add significantly to the total error.

In summary, there has been described a compact system for producing a fiducial replica of the far field beam pattern of a high energy laser system using a plurality of reflections, preferably two, at each surface 21 and 26, which exhibits an effective focal length of approximately 10 meters with a physical separation of the members 20 and 25 of only 1.05 meters with solely spherical surfaces. The portion of system for attenuating laser beam 14 by deflecting successive fractions of the beam off rear surface 28 of diffraction plate 12 provides more than 15 db of non-dissipative attenuation while minimizing diffraction envelope spill-over contributions in the desired replica. This non-dissipative attenuation permits greater grating transmittance and thus larger grating holes for a given hole density. Also, the use of spherical reflecting surfaces such as 21 and 26 preclude undue sensitivity to positioning of the members 20 and 25, and on-axis foci power densities between members 20 and 25 are well below "contaminated" air break down levels. When the system utilizes a tilted diffraction plate 12 of 45° for example, the overall system length from diffraction plate 12 to primary focal plane 36 is less than 1.5 meters and the total non-dissipative attenuation experienced by the zero order beam is greater than 50 db.

Figure 5:
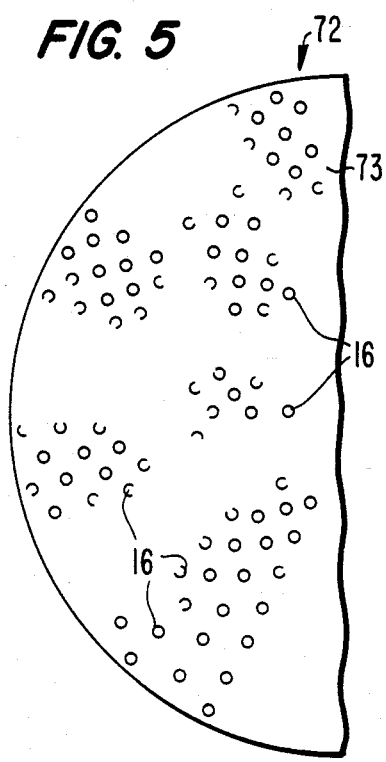
FIG. 5 is a fragmentary plan view of a plate illustrating an arrangement of spaced holes for effecting transmittance and diffraction of a circular or annular high energy laser beam, for use in the system of FIG. 1 or 2.

In accordance with another embodiment of the invention and with reference to FIG. 2 and FIG. 5, system 11 produces an attenuated fiducial replica, from a laser source that may be either annular as previously described in connection with FIG. 1 such as 15, or a circular high energy laser beam such as 71, in FIG. 2. System 11 may include a plate 72 having spaced holes such as 16 (see FIG. 5) of a selected diameter and density that cover the entire area of plate 72. Plate 72 has a flat first or front reflective surface 73 and a rear or second surface 74 similar to the embodiment previously described. System 11 includes primary reflector 75 that may have an elliptical reflecting surface 76 and a central opening 22 for reflecting laser beam energy that is transmitted through holes 16. Positioned between reflector surface 76 and rear surface 74 is a transparent optical quality zinc selenide (ZnSe) plate 77 having an uncoated flat surface 78 opposing elliptical surface 76 and a flat surface 80 opposing rear reflective surface 74 of plate 72. Surface 80 has an anti-reflection coating for transmitting all unwanted laser energy to surface 74 of plate 72. The desired diffracted orders are reflected from elliptical surface 76, and re-reflected from surface 78 to elliptical surface 76, a selected number of times and then through central opening 22 to primary focal plane 36. As in the previously described embodiment, the degree of attenuation and effective focal length is determined by the number of reflections of the laser beam on uncoated surface 78 of the partially reflective member 77. As shown in FIG. 5, plate 72 has holes 16 spaced over the entire surface 38 making it acceptable for either an annular or circular laser beam as previously mentioned.

It will be apparent to those skilled in the art that various modifications and variations can be made in the system of the present invention, including the construction of diffraction plates 12 and 72, reflectors 20 and 76, and partially reflective members 25 and 77, respectively, without departing from the scope or spirit of the invention. Thus, it is intended that the present invention cover the modification and variations of this invention provided they come within the scope of the appended claims and their equivalents.

We claim:

1. A system for producing from a laser beam source an attenuated fiducial replica of the high energy laser beam far field pattern, comprising first deflecting means for non-dissipatively deflecting a fraction of laser beam energy of the incident laser beam source in an angular direction with respect to the axis of the incident laser beam;

means for transmitting undeflected laser beam energy having energy substantially greater than energy ultimately delivered to the replica to be produced in a forward direction substantially parallel to the axis of an incident laser beam source;

means having a central aperture for reflecting said transmitted laser beam energy in a rearward direction surrounding the axis of the laser beam source;

optical folding means disposed between said transmitting means and said reflecting means in axial alignment with said reflecting means aperture to re-reflect in a forward direction surrounding the axis of said transmitted beam toward said reflecting means a fractional portion of the reflected laser beam energy a predetermined number of times for producing in a focal plane substantially on the axis of the transmitted beam a far field replica of the laser beam source having attenuated energy corresponding to the final re-reflected fractional portion of the reflected fraction, said optical folding means being disposed and configured to have an effective focal length substantially longer than the physical length of the system;

second deflecting means disposed and opposite the first deflecting means for deflecting non-dissipatively in an angular direction the laser energy reflected by said reflecting means; and means disposed off-axis of the transmitted and reflected beams for absorbing the laser energy deflected by said first and second deflecting means.

2. A system according to claim 1 wherein said first deflecting means comprises a first flat reflective surface oriented at an angle to the axis of an incident laser beam.

3. A system according to claim 2 wherein said second deflecting means comprises a second flat reflective surface parallel to and facing in a direction opposite said first flat reflective surface of said first deflecting means.

4. A system according to claim 3 wherein said transmitting means comprises a plurality of spaced holes extending through said first and second flat surfaces.

5. A system according to claim 3 wherein said transmitting means comprises a plurality of spaced holes in an annular configuration extending through said first and second flat surfaces for transmitting diffracted orders of a high energy annular laser beam.

6. A system according to claim 1 wherein said optical folding means comprises a lens made of zinc selenide.

7. A system for producing from a high energy laser beam a far field fiducial replica of such beam having a pre-selected attenuated value, said system comprising a diffraction plate having a reflective flat front surface for deflecting a first portion of energy of a laser beam incident upon said front surface, said diffraction plate having selectively spaced holes of a selected diameter and depth for transmitting laser energy greater than the preselected attenuated value of the replica, said holes being of a sufficient diameter to optimize shrinkage of each diffraction envelope for minimizing adjacent order overlap, and being spaced sufficiently to fully resolve zero order diffractions including sidelobes;

an optical reflector having a concave surface with a central aperture, said reflector being disposed with said central aperture in substantial axial alignment with an incident laser beam;

said diffraction plate having a highly reflective rear surface for deflecting laser beam incident energy reflected by said concave surface;

said front reflective surface opposing said rear reflective of said diffraction plate for reflecting diffraction orders of the laser beam;

optical folding means disposed between said diffraction plate and said reflective concave surface a selected distance from said concave surface, said folding means being operative to re-reflect a selected fraction of each successive reflected diffracted order a predetermined number of times for focusing said diffracted orders through said central aperture to a focal plane, said folding means being so disposed and configured to produce a replica having an image size corresponding to an effective focal length substantially longer than the distance between said plate and said concave reflective surface; and absorbing means disposed relative to said front and rear reflective surfaces of said plate to absorb the energy deflected by said front and rear surfaces.

8. A system according to claim 7 wherein said diffraction plate has holes selectively spaced to form an annulus.

9. A system according to claim 8 wherein said optical folding means has a convex surface opposing said concave surface of said optical reflector.

10. A system according to claim 8 wherein said optical folding means has a planar surface opposing said diffraction plate and further comprises an anti-reflective coating on said planar surface.

11. A system according to claim 7 wherein said spaced holes in said diffraction plate are in the form of a circle adapted to attenuate circular and annular laser beams.

12. A system according to claim 11 wherein said optical folding means comprises a partially reflective member having opposite planar surfaces opposing said concave surface and said plate.

13. A system according to claim 7 wherein said plurality of holes have a large enough diameter to position a reflected ray adjacent the primary reflector aperture such that the null value of the ray envelope is substantially coincident with the axis of the primary focal plane.

14. A system according to claim 13 wherein said plurality of holes are arranged in the form of an annulus, and each has a diameter approximately 0.08 of an inch.

15. A method of producing an attenuated fiducial replica of a high energy laser beam far field pattern, comprising:

directing a high energy laser beam against a first reflective face of a plate having a plurality of spaced holes of a pre-selected diameter, deflecting non-dissipatively from said first surface a first fraction of the directed beam, transmitting the directed beam through the holes of the plate to produce diffracted orders by the undeflected portion having energy substantially greater than that of the replica to be produced, reflecting the diffracted orders of the transmitted beam toward a second reflective surface of the plate, re-reflecting a selected portion of the reflected diffracted orders a plurality of times to produce a replica having a selected attenuation, deflecting at the second reflective surface the reflected portions of the diffracted orders, not re-reflected in the preceding step, and absorbing the beam energy deflected from the first and second surfaces of the plate.

16. A method according to claim 15, further comprising selecting the distance the diffracted orders are re-reflected from the point of reflection and the distance of the point of reflection from the second surface to select the number of re-reflections of the laser beam and the attenuation and to provide an effective focal length substantially greater than the distance of the point of reflection from said second surface.

* * * * *